Wendell S. Miller
INVENTOR.

BY William P. Green
ATTORNEY

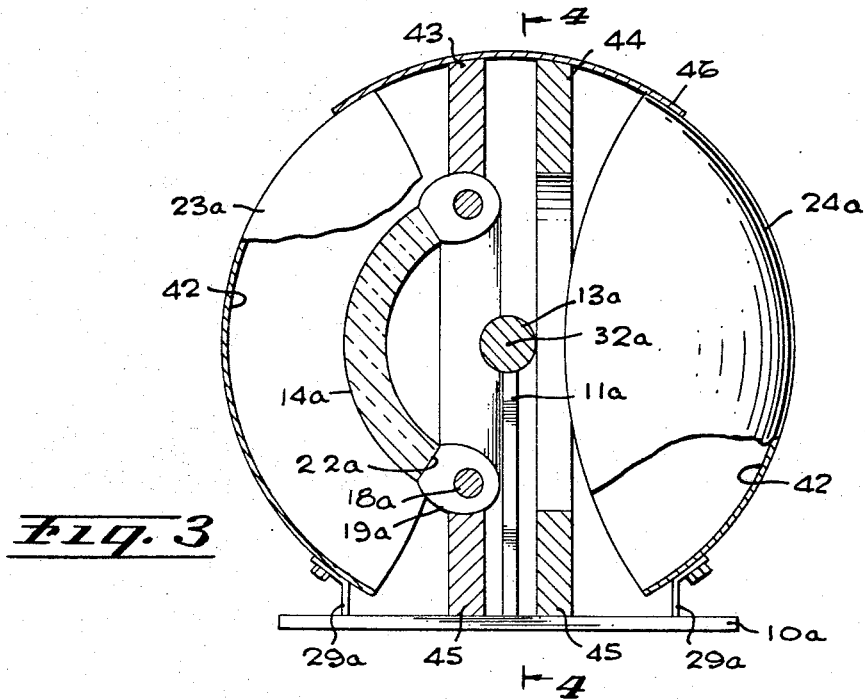
_fig. 3_
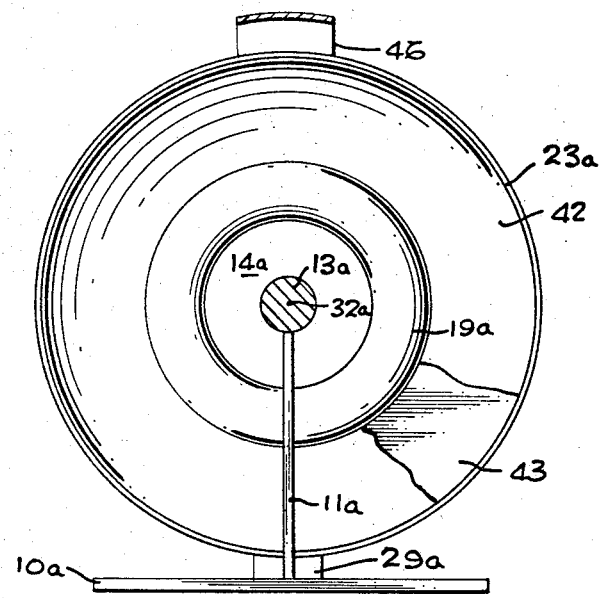
_fig. 4_
INVENTOR.
WENDELL S. MILLER
BY William P. Green
ATTORNEY United States Patent Office 3,414,835
Patented Dec. 3, 1968

1

3,414,835
CLOSED PATH LASER DEVICES
Wendell S. Miller, 1341 Comstock Ave.,
Los Angeles, Calif. 90024
Filed Aug. 15, 1962, Ser. No. 217,002
19 Claims. (Cl. 331—94.5)

This invention relates to an improved type of laser device for producing high intensity radiation by the stimulation of radiation in a lasing substance.

One of the primary purposes of lasers is that of intentionally bombarding a reaction element or a sample of a particular material with the high intensity radiation produced by the laser for the purpose of determining the response of the element or material to the light beam, or for the purpose of producing a known reaction or change in the material. The apparatus embodying the present invention is in certain respects especially adapted for use in thus treating a substance or element with laser radiation. A major object of the invention is to provide a laser structure which is capable of concentrating a laser radiation on a sample of material being treated with greater efficiency than has been possible in prior systems, so that a particular given amount of stimulated radiation will produce an increased effect on the substance being treated.

To achieve this increased result from a given amount of laser radiation, I utilize a unique laser structure which is edsigned to produce stimulated emission radiation and to direct that radiation along a closed path within the laser structure or assembly. That is, the radiation follows a path along which it is reflected through essentially a series of cycles, without allowing escape of the radiation from the laser assembly. A lasing material is positioned along the path, and acts when stimulated to cause the discussed stimulated emission type of radiation.

To treat the reaction sample or element with the radiation, the apparatus of the invention is designed to allow movement of the sample or element into and out of a position of reception in the defined path of the stimulated emission. Thus, any desired substance may be located at that point, so that the radiation may pass through the substance and produce a particular reaction thereon. If the substance is transparent, the radiation may then continue along the path and rebound back and forth through a series of cycles to repeatedly pass through the sample and maximize the effect of the radiation on the sample.

The directing of the radiation along the defined closed path is attained by providing a series of light directing surfaces constructed and positioned to deflect the stimulated light or radiation in a predetermined manner. Some of these surfaces are reflector surfaces, as mentioned above. For best results, the light directing surfaces are designed to actually focus the stimulated light rays on a predetermined point or location along the discussed closed path, so that the substance to be treated may be located at or near that point, to further increase the overall result attainable. For this focusing purpose, some of the light directing surfaces may be lens surfaces formed on an appropriate lens or lenses positioned to focus on the discussed treatment point.

In one form of the invention, the reflector surfaces are formed on a pair of prism elements located at opposite sides of the treatment point. In another form of the invention, the reflectors are two opposed spherical mirrors, centered about a common point and acting to direct all of the sitmulated emission through that point.

The above and other features and objects of the invention will be better understood from the following detailed description of the typical embodiments illustrated in the accompanying drawing, in which:

2

FIG. 3 is a side view, partially broken away, of a second form of laser structure; and FIG. 4 is a vertical section taken on line 4—4 of FIG. 3.

Figure 1:
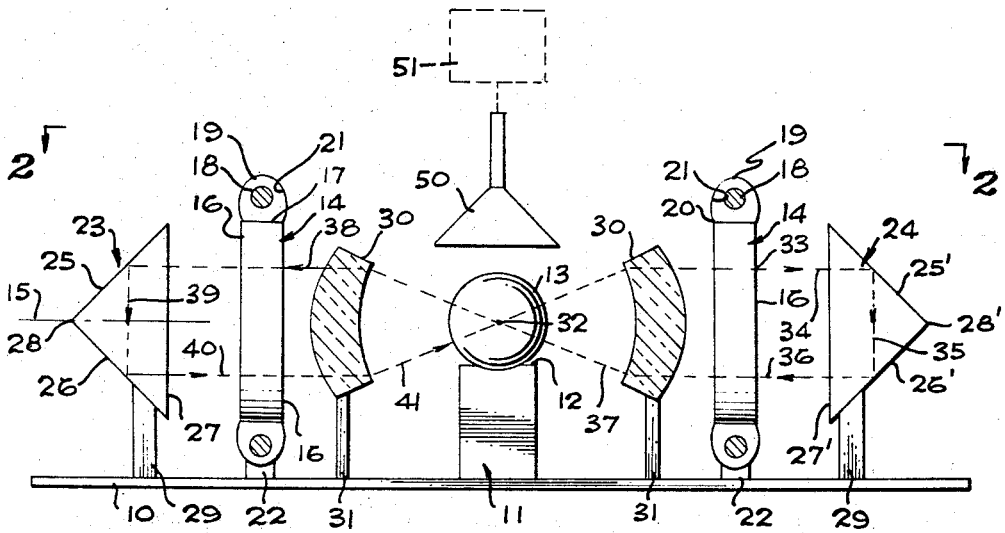
FIG. 1 is a side view representing somewhat diagrammatically a first form of laser assembly constructed in accordance with the invention.
Figure 2:
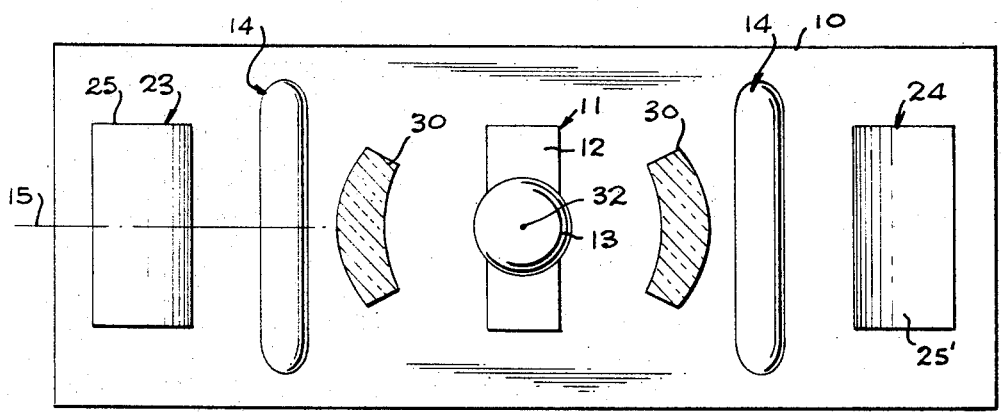
FIG. 2 is a plan view of the FIG. 1 equipment, taken on line 2—2 of FIG. 1.

In FIGS. 1 and 2, I have represented a laser structure, the various elements of which may typically be mounted on a horizontal supporting base 10. At the center of base 10, there is provided a support column or structure 11, having an upper surface 12 on which there is to be positioned a reaction chamber or reaction element 13, which is desirably axially stigmatic, and for optimum results may be a sphere. The element 13 may for example be a hollow chamber formed of a glass or other material (for example quartz) which is selected to be transparent to the radiation stimulated in the system, and containing a body of gas or other material which also may be essentially transparent to that radiation and which is to be acted on thereby. Alternatively, the element 13 may be a block of a material to be studied or acted on, such as a block of quartz, or any other material having a field dependent susceptibility.

The stimulated radiation which is directed through the element or chamber 13 is produced by two members 14 formed of a material capable of a lasing action, that is, a material having absorption and emission band structure capable of supporting stimulated emission. As an example, members 14 may be two identical discs formed of pink ruby, with these two discs being centered about a common horizontal axis 15 and having opposite parallel planar surfaces 16 disposed transversely of the axis. The peripheries of the two discs 14 may be defined by two cylindrical outer surfaces 17.

The lasing material 14 is stimulated by light of an appropriate stimulation or absorption frequency (or frequencies). In the case of pink ruby, the stimulation frequencies may be 5600 Angstroms and 4100 Angstroms, to produce a stimulated emission or radiation in the pink ruby crystals of 6943 Angstroms. The two mentioned stimulation frequencies may be supplied by conventional xenon tubes, typically taking the form of annular tubes or lamps 18 centered about axis 15 at locations outwardly beyond cylindrical surfaces 17. The effect of these lamps may be maximized by providing annular reflectors 19 about their outer sides, suitably secured at their inner edges 20 to the lasing crystals, and having their inner surfaces 21 aluminized or otherwise reflectorized to reflect light radially inwardly through the open inner side of each reflector and into the associated lasing crystal. The reflectors 19 may be of uniform axial cross-section along their entire circular extent, so that each reflector forms a portion of a toroid open at its radially inner side. This toroid may be specially designed to direct the light rays radially inwardly to lasing material 14 with maximum effectiveness, and for this purpose may have the cross-section of an ellipse or parabola, with lamp 18 being located at the focus of the parabola or at one of the focii of the ellipse. The reflectors 19 and their associated lasing members 14 are mounted to base 10 by a pair of supports represented at 22.

Axially beyond lasing members 14, the assembly of FIGS. 1 and 2 includes two primary reflector elements 23 and 24 which act to reflect the stimulated radiation back and forth through the intermediate lasing members. For optimum control of the paths of reflection, it is desired that elements 23 and 24 take the form of right angle prisms. The prism 23 has two mutually perpendicular planar surfaces 25 and 26, inclined at forty-five degree angles relative to axis 15, with the opposed planar hypotenuse surface 27 of the prism extending perpendicular to axis 15 and in a vertical plane as seen in FIG. 1. The corner 28 of the prism intersects axis 15 and is perpendicular thereto.

The second prism 24 is constructed the same as prism 23, but positioned reversely, so that perpendicular planar surfaces 25' and 26' are inclined at 45 degree angles to axis 15 but advance to the left from corner 28' rather than to the right. Planar hypotenuse surface 27' of prism 24 is disposed transversely of axis 15, and corner 28' of the prism is parallel to corner 28 of prism 23. The two prisms may have maximum vertical and horizontal dimensions corresponding approximately to the diameter of lasing members 14. Prisms 23 and 24 may be mounted to base 10 in any convenient manner, as by a pair of supports represented at 29.

Between each of the lasing members 14 and the location of reaction chamber 13, there is positioned a lens 30. These two lenses may be identical and centered about the main axis 15 of the apparatus, and may be supported by a pair of supporting columns 31. Each of the lenses is constructed and positioned to accept rays which are parallel to axis 15 and focus those rays at a central focus point 32, which is positioned at approximately the center of the area in which the chamber or reaction element 13 is to be located. To achieve this purpose, it is desirable to use lenses which are axially stigmatic with respect to rays parallel to axis 15, such as for example Cartesian Oval lenses or the axially stigmatic lenses discussed in "Principles of Optics" by Born and Wolf, section 4.10.1, first edition, specifically with reference to Equation 12 on page 199. As will be apparent, the prisms or end reflector elements numbered 23 and 24 and the lenses 30 are all constructed of a material which is transparent to the stimulated radiation produced by lasing members 14.

In using the apparatus of FIGS. 1 and 2, an operator first positions the chamber or element 13 at the illustrated location, and then energizes lamps 18, to produce radiation at an appropriate frequency or frequencies to be absorbed by members 14 and stimulate those members to the production of stimulated emission or radiation at a frequency characteristic of the material of which members 14 are formed. The reflecting and refracting surfaces of the prisms and lenses then function to direct the stimulated radiation along closed circulation paths within the illustrated assembly, which paths pass through focus point 32 to act on the material being treated. To follow one such path, assume that a particular ray of light emanates from the right hand one of the two lasing members 14 in a rightward direction parallel to axis 15, and at the point designated 33 in FIG. 1. This ray travels rightwardly as indicated at 34, until it strikes totally reflective surface 25' of prism 24, and is reflected directed downwardly by that surface at 35. Next, the downwardly advancing ray strikes totally reflective surface 26', and is reflected to the left, parallel to axis 15 along the path 36 until it reaches lens 30. By virtue of the discussed characteristics of lens 30, the ray is then focused inwardly at 37 to pass through focal point 32, and ultimately strike the second lens 30 at the opposite side of the focal point. The ray is then refracted to a horizontal path at 38, to strike surface 25 of prism 23 and be reflected downwardly by that surface at 39, then being reflected rightwardly parallel to axis 15 at 40, by surface 26, until the ray is refracted by the left one of the two lenses 30 to pass along path 41 through focal point 32 and to the right lens. The right lens brings the ray back to an axial orientation, to again follow along path 34 toward prism 24. Thus, the radiation follows a closed path, that is, a path which continues through many cycles within the assembly without allowing escape of the radiation from the assembly. Also, each time that the radiation passes through one of the lasing members 14, the radiation tends to cause the alignment of additional stimulated radiation with the initial rays, so that the radiation along the defined path, and other similar paths, builds up rapidly to produce a circulation of light at high intensity in the discussed manner. The lenses 30 focus all of this light on the point 32, or the area surrounding point 32, to attain a maximum effect on the reaction element 13 or the substance contained within that reaction element if the element is in the form of a reaction chamber. After a particular element 13 has been treated by the radiation, it may be removed and another element located in its place for similar treatment.

FIGS. 3 and 4 show a second form of the invention in which there are substituted for the two prism type reflectors 23 and 24, a pair of spherically curved reflector shells 23a and 24a, centered about a common point 32a. Shells 23a and 24a may be identical with one another, and located at diametrically opposite positions with respect to center 32a. The inner surfaces 42 of shells 23a and 24a are aluminized, silvered, or otherwise rendered specularly reflective, so that light may reflect repeatedly back and forth between two corresponding diametrical opposed points on the two surfaces 42, and through center 32a, to pass through a preferably transparent reaction element or chamber 13a mounted on a support 11a at center 32a. Support 11a may be carried by a base structure 10a to which the partial spherical shells 23a and 24a are mounted by supports 29a. As will be apparent from FIGS. 3 and 4, the two partial spherical shells 23a and 24a may be less than hemispheres in size, to leave an opening at one or both sides of the apparatus through which the reaction element or chamber 13a may be inserted into position on support 11a.

The lasing material in FIGS. 3 and 4 may take the form of a piece of pink ruby or other substance 14a capable of producing stimulated emission. Element 14a is illustrated as shaped to the form of a portion of a sphere, having a wall which is of uniform radial thickness at all points, and is centered about the same axis 32a as are shells 23a and 24a. Material 14a may be stimulated by an annular xenon lamp 18a positioned within an annular toroidally shaped internally reflective element 19a having an open side at 22a through which stimulating radiation may emit from reflector 19a into the spherically shaped element 14a. The cross-section of reflector 19a is desirably elliptical or parabolic, as in the case of reflector 19 in FIG. 1, with lamp 18a being positioned at the focus of the parabola or one of the focii of the ellipse, to direct the rays into element 14a.

About member 19a, and connected thereto, there may be provided an absorber member 43 formed of a material, such as Prussian Blue, which is capable of absorbing the stimulated emission produced by member 18a, so that stray rays of that emission which are not passing through center 32a of the system will be absorbed by element 43 or a second similar element 44. Elements 43 and 44 may be mounted by supports 45 to a base 10a, and may be connected at their upper ends to partial spherical reflectors 23a and 24a by a connector strap 46. The parts 14a and 19a may be held in their illustrated operative positions by virtue of their connection to element 43.

In using the apparatus of FIGS. 3 and 4, the sample 13a is placed on support 11a, and lamp 18a is then energized to stimulate lasing material 14a. This material then commences to produce a stimulated emission, and this stimulated radiation is repeatedly reflected back and forth between corresponding diametrically opposed portions of the two reflectors 23a and 24a, to repeatedly pass through element 14a and be strengthen in intensity by that element, with all of the resulting radiation being passed through or focused on center 32a, to thereby subject the sample 13a to very high intensity stimulated radiation.

Where the lasing elements 14 of FIG. 1 (or the corresponding elements of any of the other forms of the invention), are capable of producing two different stimulated emission frequencies, element 13 may be capable of functioning as a detector and will then itself radiate at the difference frequency of the two optical frequencies, To collect such radiation, a horn or antenna 50 may be positioned in proximity to element 13, to receive such radiation and deliver it to a utilization device 51 responsive to or actuated by the difference frequency.

I claim:

1. The combination comprising a laser structure having light directing surfaces defining a closed path along which stimulated emission radiation is directed by said surfaces, said structure including a lasing material for producing stimulated emission radiation along said closed path, means for stimulating said lasing material, a work unit responsive to said radiation and positioned at a location for impingement on said unit of said radiation as it follows said closed path, and means for supporting said work unit at said location.

2. The combination as recited in claim 1, in which said work unit is essentially transparent to said radiation.

3. The combination comprising a laser structure having light directing surfaces defining a closed path along which stimulated emission radiation is directed by said surfaces, said structure including a lasing material for producing stimulated emission radiation along said closed path, means for stimulating said lasing material, a work unit responsive to said radiation and positioned at a location for impingement on said unit of said radiation as it follows said closed path, and means for supporting said work unit at said location, said surfaces including focusing means for focusing said radiation on said work unit as it passes along said closed path.

4. The combination comprising a laser structure having light directing surfaces defining a closed path along which stimulated emission radiation is directed by said surfaces, said structure including a lasing material for producing stimulated emission radiation along said closed path, means for stimulating said lasing material, a work unit responsive to said radiation and positioned at a location for impingement on said unit of said radiation as it follows said closed path, and means for supporting said work unit at said location, said surfaces including lens surfaces operable to focus said radiation on said work unit as it passes along said closed path.

5. The combination comprising a laser structure having light directing surfaces defining a closed path along which stimulated emission radiation is directed by said surfaces, said structure including a lasing material for producing stimulated emission radation along said closed path, means for stimulating said lasing material, and a work unit responsive to said radiation and positioned for impingement on said unit of said radiation as it follows said closed path, said surfaces including reflector surfaces operable to focus said radiation on said work unit as it passes along said closed path.

6. The combination comprising a laser structure having light directing surfaces defining a closed path along which stimulated emission radiation is directed by said surfaces, said structure including a lasing material for producing stimulated emission radiation along said closed path, means for stimulating said lasing material, a work unit responsive to said radiation and positioned at a location for impingement on said unit of said radiation as it follows said closed path, and means for supporting said work unit at said location, said surfaces including spaced reflector surfaces positioned at opposite sides of said work unit and acting to reflect said radiation back and forth therebetween and through said unit.

7. The combination comprising a laser structure having light directing surfaces defining a closed path along which stimulated emission radiation is directed by said surfaces, said structure including a lasing material for producing stimulated emission radiation along said closed path, means for stimulating said lasing material, and a work unit responsive to said radiation and positioned for impingement on said unit of said radiation as it follows said closed path, said surfaces including a first pair of reflector surfaces disposed at right angles to one another and forming a reflector corner at essentially a first side of said work unit, and a second pair of reflector surfaces disposed at right angles to one another and forming a second reflector corner at essentially the opposite side of said work unit and adapted to coact with said first corner in reflecting said radiation back and forth therebetween and through said unit.

8. The combination comprising a laser structure having light directing surfaces defining a closed path along which stimulated emission radiation is directed by said surfaces, said structure including a lasing material for producing stimulated emission radiation along said closed path, means for stimulating said lasing material, and a work unit responsive to said radiation and positioned for impingement on said unit of said radiation as it follows said closed path, said surfaces including a first pair of reflector surfaces disposed at right angles to one another and forming a reflector corner at essentially a first side of said work unit, and a second pair of reflector surfaces disposed at right angles to one another and forming a second reflector corner at essentially the opposite side of said work unit and adapted to coact with said first corner in reflecting said radiation back and forth therebetween and through said unit, and lens surfaces positioned between said reflector surfaces and acting to essentially focus said radiation on said unit.

9. The combination comprising a laser structure having light directing surfaces defining a closed path along which stimulated emission radiation is directed by said surfaces, said structure including a lasing material for producing stimulated emission radiation along said closed path, means for stimulating said lasing material, and a work unit responsive to said radiation and positioned for impingement on said unit of said radiation as it follows said closed path, said surfaces including a first pair of reflector surfaces disposed at right angles to one another and forming a reflector corner at essentially a first side of said work unit, and a second pair of reflector surfaces disposed at right angles to one another and forming a second reflector corner at essentially the opposite side of said unit and adapted to coact with said first corner in reflecting said radiation back and forth therebetween and through said unit, said laser structure including lens means between said reflector corners and along the path of said radiation, some of said surfaces being surfaces on said lens means acting to essentially focus said radiation on said work unit.

10. The combination comprising a laser structure having light directing surfaces defining a closed path along which stimulated emission radiation is directed by said surfaces, said structure including a lasing material for producing stimulated emission radiation along said closed path, means for stimulating said lasing material, and a work unit responsive to said radiation and positioned for impingement on said unit of said radiation as it follows said closed path, said laser structure including two spaced right angle prisms at opposite sides of said unit, some of said surfaces being corner reflector surfaces on said prisms acting to reflect said radiation back and forth therebetween.

11. The combination comprising a laser structure having light directing surfaces defining a closed path along which stimulated emission radiation is directed by said surfaces, said structure including a lasing material for producing stimulated emission radiation along said closed path, means for stimulating said lasing material, and a work unit responsive to said radiation and positioned for impingement on said unit of said radiation as it follows said closed path, said laser structure including two spaced right angle prisms at opposite sides of said work unit, some of said surfaces being corner reflector surfaces on said prisms acting to reflect said radiation back and forth therebetween, said laser structure including two lenses between said prisms and at opposite sides of said work unit, some of said first mentioned surfaces being surfaces on said two lenses acting to essentially focus said radiation on said unit, and means for supporting said work unit at said location.

12. The combination comprising a laser structure having light directing surfaces defining a closed path along which stimulated emission radiation is directed by said surfaces, said structure including a lasing material for producing stimulated emission radiation along said closed path, means for stimulating said lasing material, and a work unit responsive to said radiation and positioned for impingement on said unit of said radiation as it follows said closed path, said surfaces including two opposed, concavely curved reflector surfaces positioned at opposite sides of said work unit, and acting to reflect said radiation back and forth therebetween and through said unit.

13. The combination comprising a laser structure having light directing surfaces defining a closed path along which stimulated emission radiation is directed by said surfaces, said structure including a lasing material for producing stimulated emission radiation along said closed path, means for stimulating said lasing material, and a work unit responsive to said radiation and positioned for impingement on said unit of said radiation as it follows said closed path, said surfaces including two opposed concavely curved partial spherical reflector surfaces positioned at opposite sides of said work unit and acting to reflect said radiation back and forth therebetween and through said unit.

14. The combination comprising a laser structure having light directing surfaces defining a closed path along which stimulated emission radiation is directed by said surfaces, said structure including a lasing material for producing stimulated emission radiation along said closed path, means for stimulating said lasing material, and a work unit responsive to said radiation and positioned for impingement on said unit of said radiation as it follows said closed path, said surfaces including two opposed concavely curved partial spherical reflector surfaces positioned at opposite sides of said work unit and both centered essentially about said unit and acting to reflect said radiation back and forth therebetween and through said unit.

15. The combination comprising a laser structure having light directing surfaces defining a closed path along which stimulated emission radiation is directed by said surfaces, said structure including a lasing material for producing stimulated emission radiation along said closed path, means for stimulating said lasing material, and a work unit responsive to said radiation and positioned for impingement on said unit of said radiation as it follows said closed path, said surfaces including two opposed concavely curved partial spherical reflector surfaces positioned at opposite sides of said work unit and both centered essentially about said work unit and acting to reflect said radiation back and forth therebetween and through said unit, said lasing material being curved spherically about the center of curvature of said partial spherical reflector surfaces at a location between said unit and one of said spherical reflector surfaces.

16. The combination comprising a laser structure having light directing surfaces defining a closed path along which stimulated emission radiation is directed by said surfaces, said structure including a lasing material for producing stimulated emission radiation along said closed path, means for stimulating said lasing material and a work unit responsive to said radiation and positioned for impingement on said unit of said radiation as it follows said closed path, said surfaces including two opposed, concavely curved reflector surfaces positioned at opposite sides of said unit and acting to reflect said radiation back and forth therebetween and through said unit, said lasing material being concavely curved and positioned between said unit and one of said reflector surfaces.

17. The combination comprising a laser structure having light directing surfaces defining a closed path along which stimulated emission radiation is directed by said surfaces, said structure including a lasing material for producing stimulated emission radiation along said closed path, means for stimulating said lasing material, and a work unit responsive to said radiation and positioned for impingement on said unit of said radiation as it follows said closed path, said stimulating means including a reflector forming essentially a toroid about said lasing material and open at its radially inner side and containing an radiation which is reflected inwardly by the reflector to said lasing material.

18. A laser structure comprising a lasing material operable to produce stimulated emission radiation, means for stimulating said lasing material to produce said radiation, and light directing surfaces defining a closed path along which said stimulated emission radiation produced by the lasing material is directed by said surfaces, there being a location along said path which is open to movement of a work unit to be acted on by said radiation into and out of the path of the radiation for impingement of said radiation on said unit without escape from said closed path, said light directing surfaces being constructed to prevent the escape of any coherent beam of said stimulated radiation from said closed path.

19. A laser structure comprising a lasing material operable to produce stimulated emission radiation, means for stimulating said lasing material to produce said radiation, light directing surfaces defining a closed path along which said stimulated emission radiation produced by the lasing material is directed by said surfaces, there being a location along said path which is open to movement of a work unit to be acted on by said radiation into and out of the path of the radiation for impingement of said radiation on said unit without escape from said closed path, and means for supporting said work unit at said location.

References Cited

UNITED STATES PATENTS

| | | | |
|---|---|---|---|
| 3,055,257 | 9/1962 | Boyd et al. | 88—1 |
| 3,223,944 | 12/1965 | Luck et al. | 331—94.5 |
| 3,242,439 | 3/1966 | Rigden et al. | 331—94.5 |
| 3,258,717 | 6/1966 | Katzman | 331—94.5 |
| 3,286,193 | 11/1966 | Koester et al. | 331—94.5 |
| 3,289,101 | 11/1966 | Masters et al. | 331—94.5 |

FOREIGN PATENTS

| | | |
|---|---|---|
| 484,199 | 4/1938 | Great Britain. |
| 856,196 | 11/1952 | Germany. |

OTHER REFERENCES

Factory, "Taming the Laser Ray for Industry," Factory vol. 120, No. 4, pp. 96–97, April 1962.

Katzman et al., "Optical Maser Utilizing Multiple Ruby Sections in a Spherical Resonator," Journal of the Optical Society of America, vol. 52, No. 5, p. 602, May 1962.

JEWELL H. PEDERSEN, *Primary Examiner.*

RONALD L. WIBERT, *Assistant Examiner.*